Figure 4:
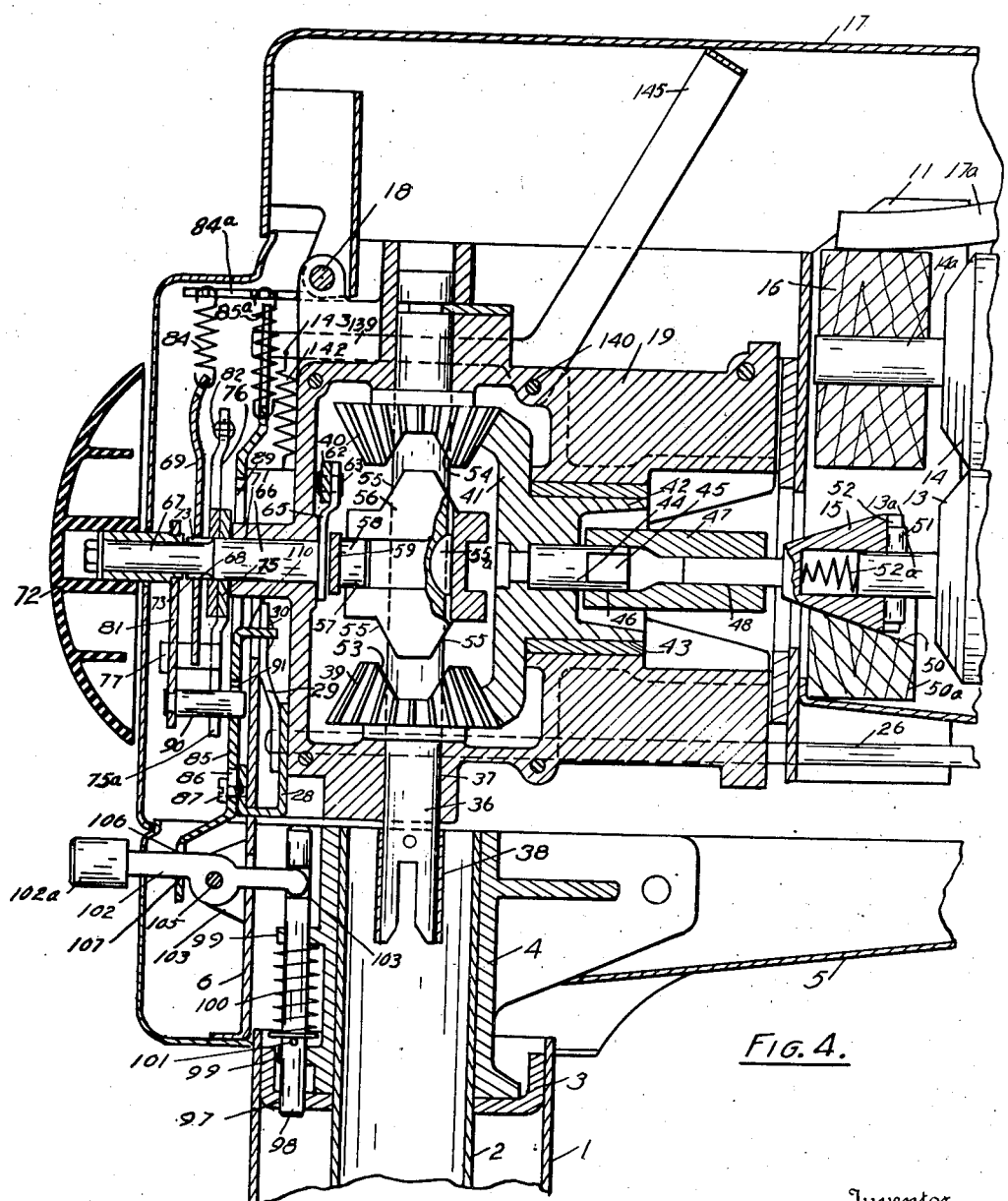

Aug. 3, 1948.   W. L. KAUFFMAN, 2D   2,446,477
WRINGER AND THE LIKE
Filed May 1, 1942   7 Sheets-Sheet 1
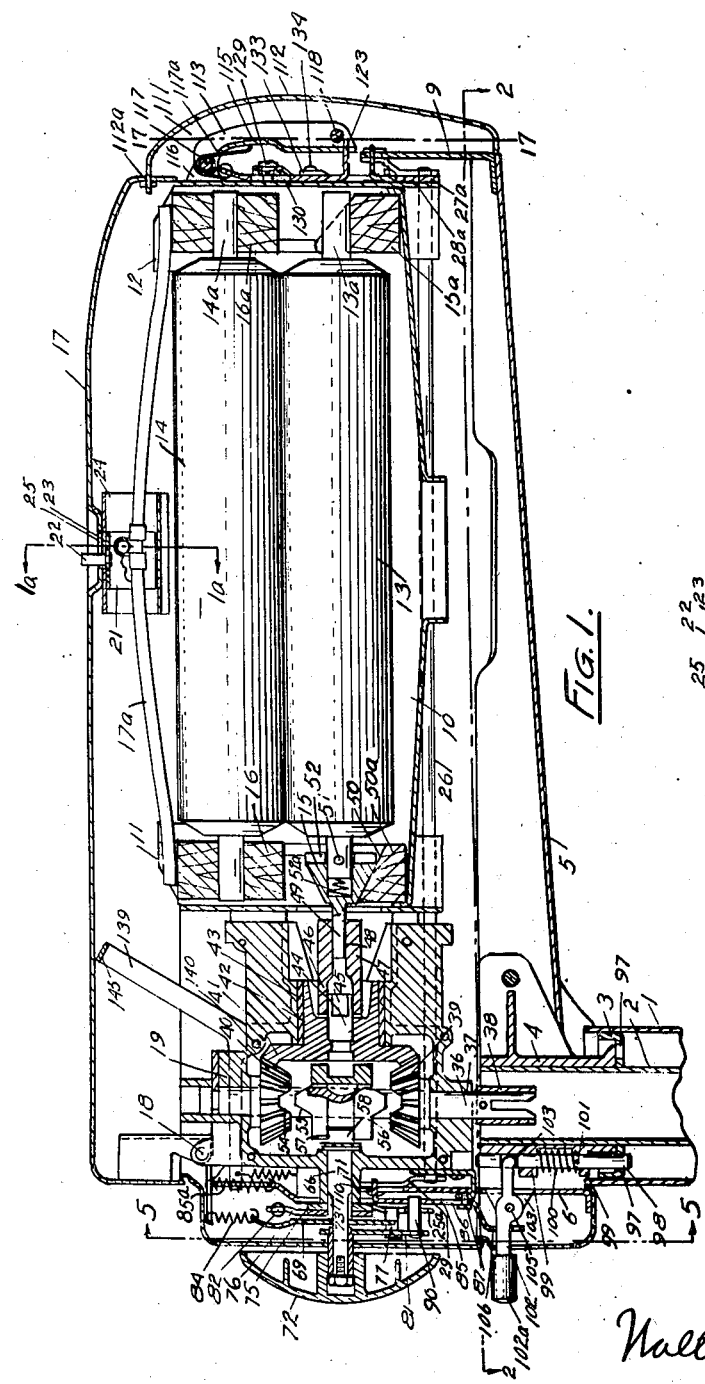
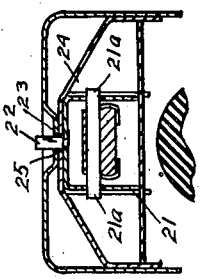
Fig.1.
Fig.1a.
Walter L. Kauffman II
INVENTOR
BY
ATTORNEYS

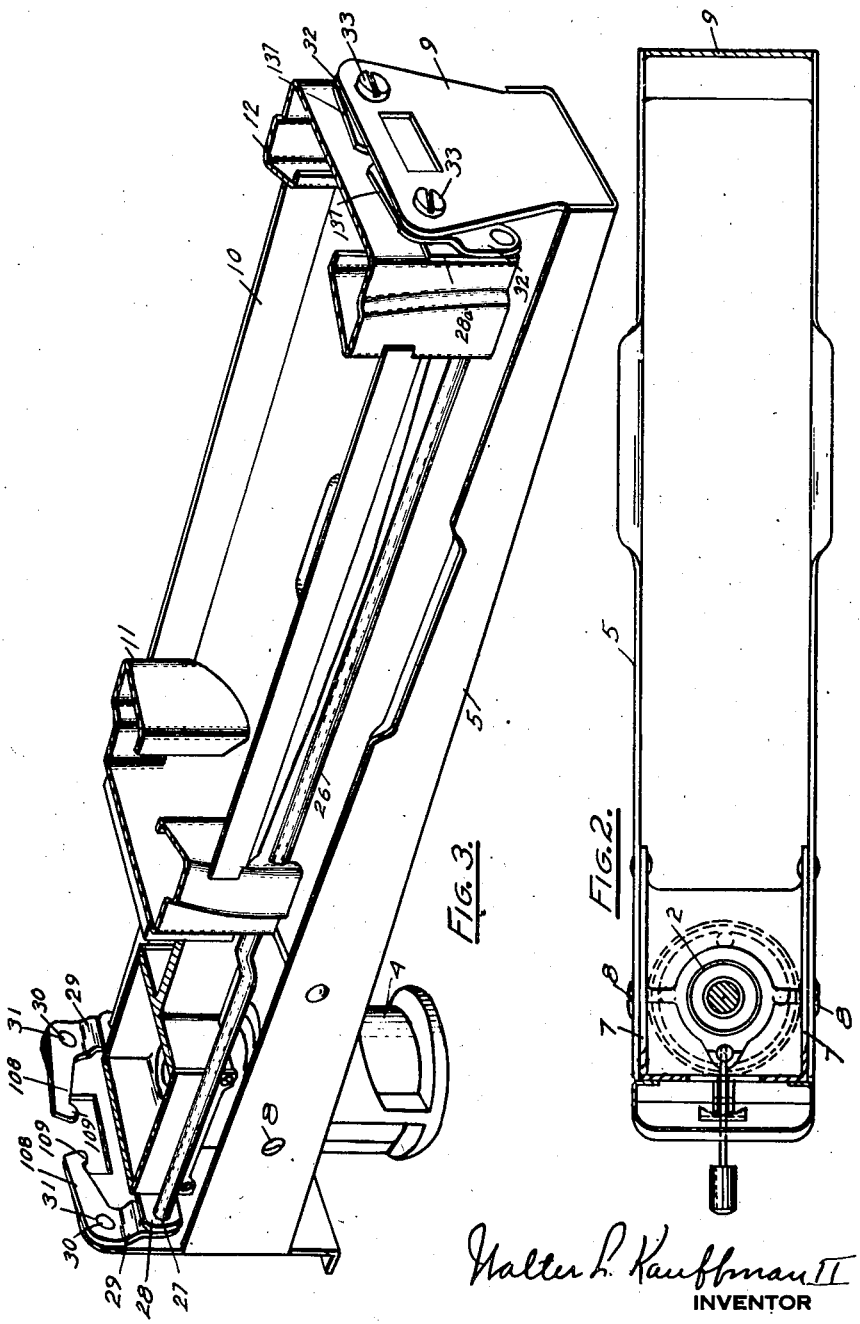

Aug. 3, 1948.　　W. L. KAUFFMAN, 2D　　2,446,477
WRINGER AND THE LIKE
Filed May 1, 1942　　7 Sheets-Sheet 3

Inventor
Walter L. Kauffman II
By
Attorney

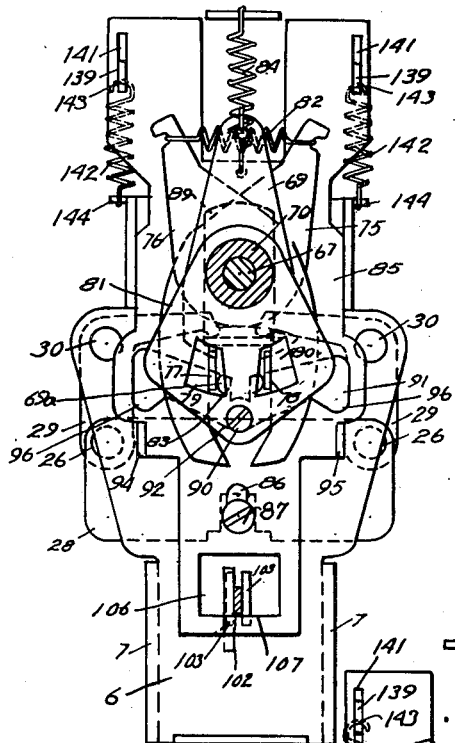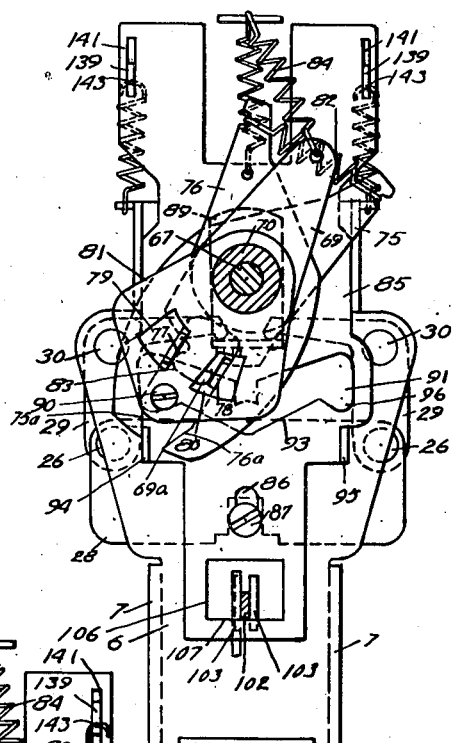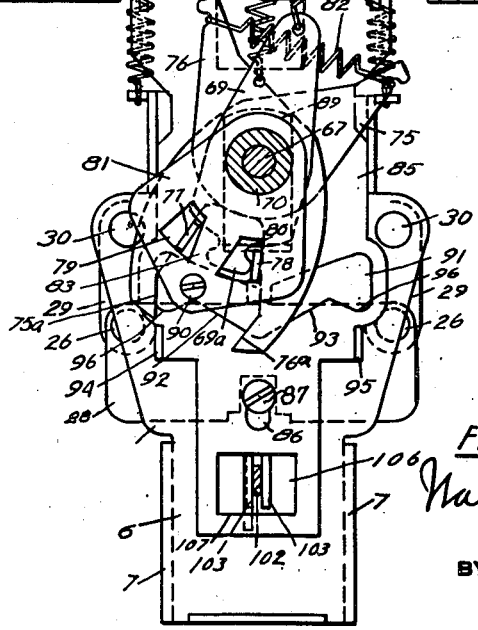

Aug. 3, 1948.   W. L. KAUFFMAN, 2D   2,446,477
WRINGER AND THE LIKE
Filed May 1, 1942   7 Sheets-Sheet 5
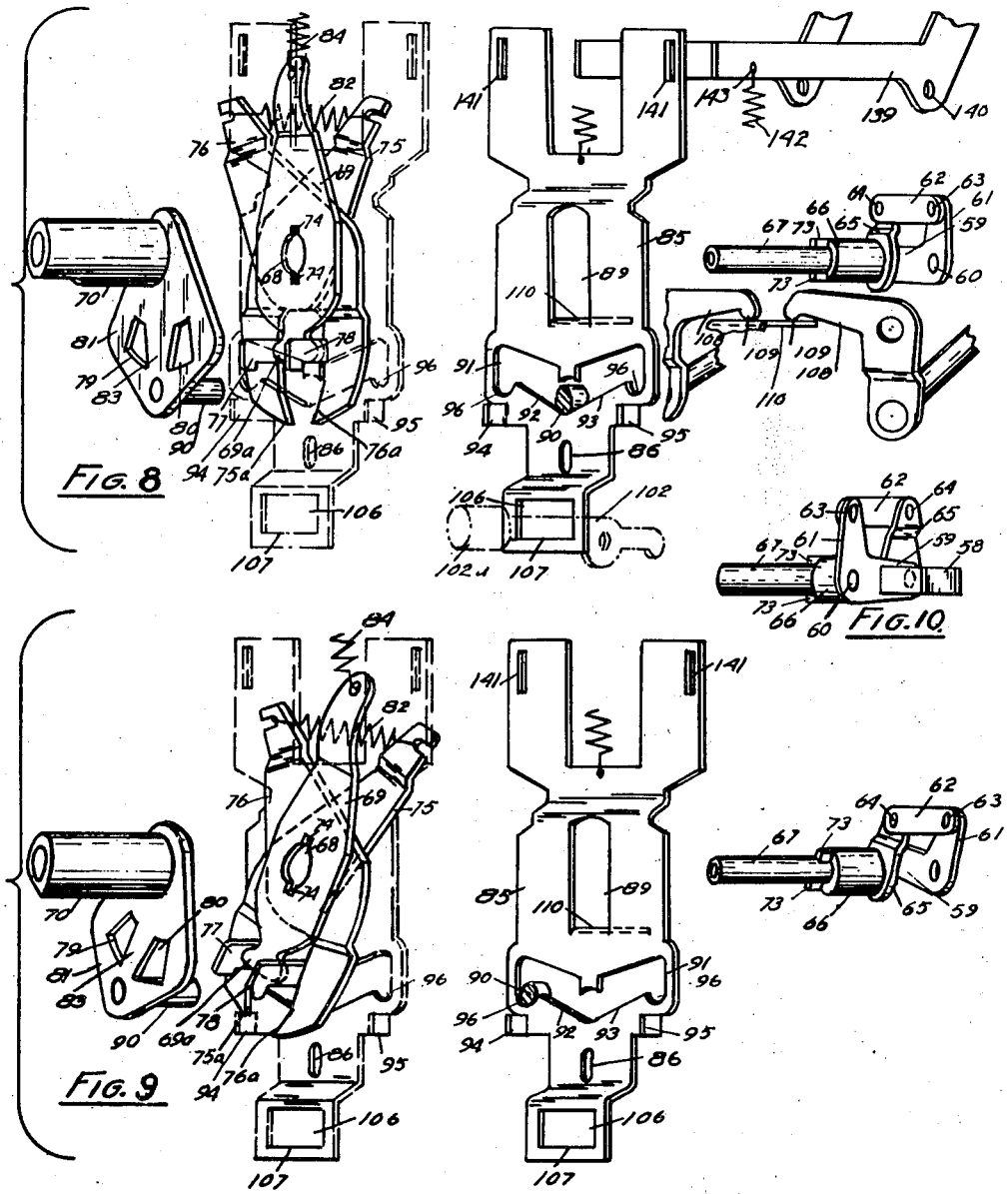

Aug. 3, 1948. W. L. KAUFFMAN, 2D 2,446,477
WRINGER AND THE LIKE
Filed May 1, 1942 7 Sheets-Sheet 6
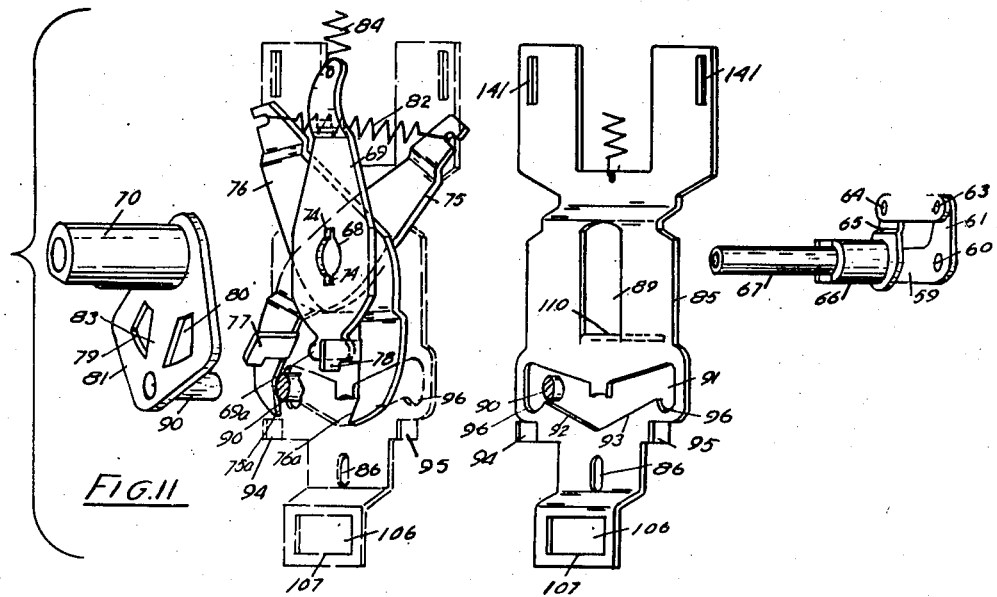
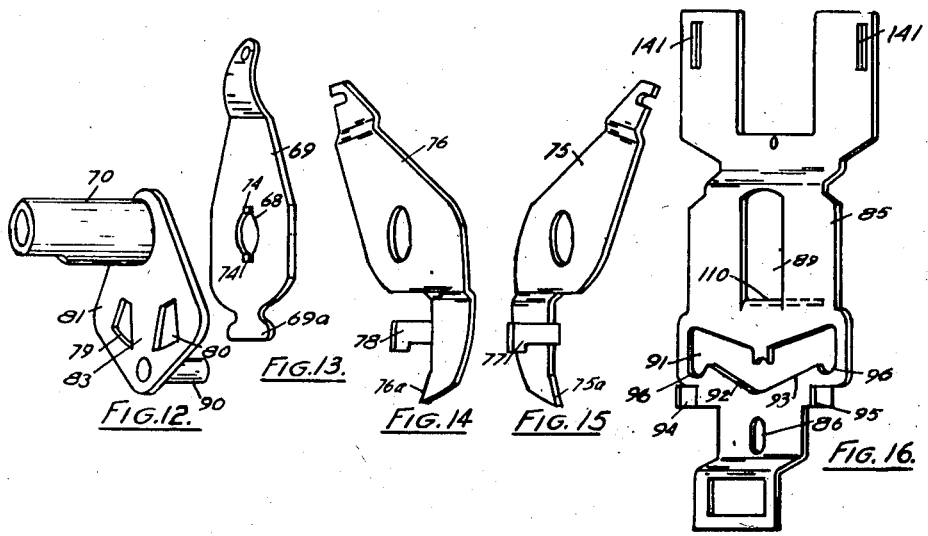
Walter L. Kauffman II
Inventor
By T. L. Lind
Attorney Aug. 3, 1948.   W. L. KAUFFMAN, 2D   2,446,477
WRINGER AND THE LIKE
Filed May 1, 1942   7 Sheets-Sheet 7
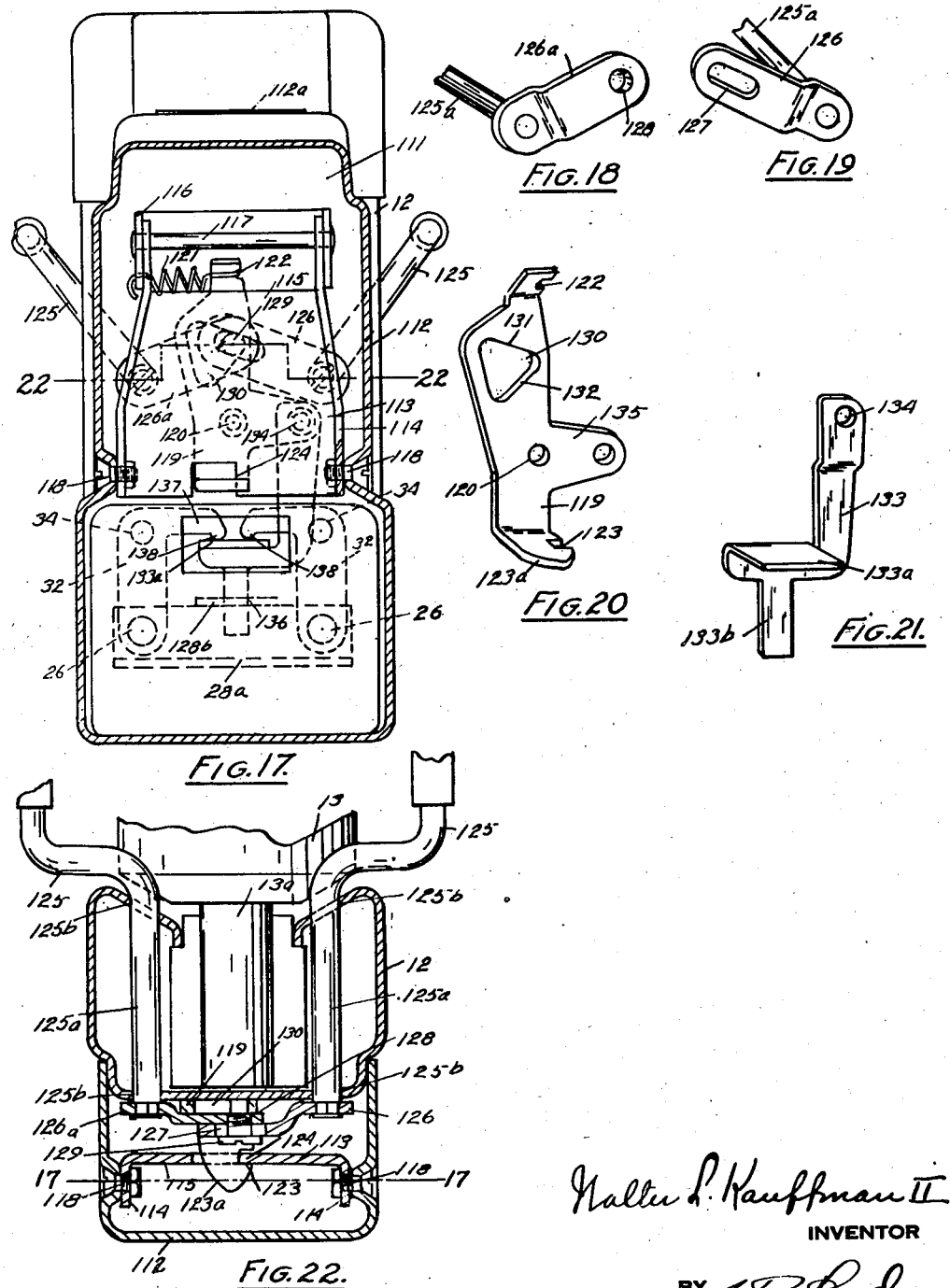

Patented Aug. 3, 1948

2,446,477

UNITED STATES PATENT OFFICE 2,446,477

WRINGER AND THE LIKE

Walter L. Kauffman, II, Erie, Pa., assignor to Lovell Manufacturing Company, Erie, Pa., a corporation of Pennsylvania Application May 1, 1942, Serial No. 441,331

20 Claims. (Cl. 68—253)

The present invention relates to wringers and the like. The invention is directed to improvements in structure, improvements in normal functioning or operation and control of the wringer, and improvements in safety features of the wringer whereby the safety may be achieved with greater certainty and also in the convenience and flexibility in the ordinary normal control of the wringer.

In carrying out the invention, safety means are provided for stopping the driving of the wringer under emergency conditions manually and also automatically in response to excess loads which may involve possible injury to a person or possible injury to the structure. It also involves structural features with relation to features as to relief mechanism, particularly the relief mechanism which is responsive to wringer movement, ordinarily referred to as an instinctive release. The invention further involves the relative and cooperative function of these different features in the structure.

Features and details of the invention will appear from the specification and claims.

A preferred embodiment of the invention is illustrated in the accompanying drawings, which illustrate the invention as applied to a wringer.

Fig. 1 shows a central vertical longitudinal section of a wringer, some parts being omitted.

Fig. 1a a section on the line 1a—1a in Fig. 1.

Fig. 2 a section on the line 2—2 in Fig. 1.

Fig. 3 a view illustrating the manner of movably sustaining the wringer frame for effecting an instinctive release.

Fig. 4 an enlarged view in section similar to that of Fig. 1 of the driving mechanism of the wringer and the controls therefor.

Fig. 5 an end elevation of the control mechanism with the parts at neutral, the view being a section on the line 5—5 in Fig. 1.

Fig. 6 a similar view of the drive control with the parts in set position.

Fig. 7 a similar view with the parts in position at the moment of effecting a release from set position.

Fig. 8 an exploded perspective view of the driving control with the wringer at neutral.

Fig. 9 a similar view with the parts in set position.

Fig. 10 a perspective view of the clutch throwing mechanism.

Fig. 11 an exploded view of the drive control mechanism with the parts at the position assumed at the moment of release.

Figs. 12 to 16, detailed views of the detached parts of the control mechanism.

Fig. 17 a section on the lines 17—17 in Figs. 1 and 22 showing details of the pressure release mechanism.

Figs. 18 to 21, detailed views of detached parts of the pressure release mechanism.

Fig. 22 a section on the line 22—22 in Fig. 17.

1 marks the outer shell of a sustaining post, 2 an inner member thereof. These are of tube form and of ordinary construction, the inner member extending above the outer member. A supporting plate 3 is arranged between the members 1 and 2 and forms a swivel support for the wringer. A swivel head 4 is journalled on the extension of the member 2 and rests on the support 3. A wringer support 5 is secured to the swivel head and extends horizontally under the wringer proper. This arm 5 is of channel form, the sides of the channel being extended on each side of the head 4 and secured thereto. A post 6 has a U-shaped lower end, the sides 7 of which extend over the faces of the head 4 and are secured thereto by screws 8. A post 9 extends upwardly from the opposite end of the arm 5 and forms a means for supporting the outer end of the wringer frame, as will be hereinafter more fully described.

The wringer frame comprises a base 10, stiles 11 and 12, and wringer rolls 13 and 14, these wringer rolls having shafts 13a and 14a respectively. The shaft 13a is journalled at one end in a bearing 15 which will be more fully hereinafter described, and the opposite end of the shaft in a bearing 15a anchored in the stile 12. The shaft 14a is journalled in movable bearings 16 and 16a.

The wringer is provided with a top 17 which is hinged by means of a pin 18 to the gear head 19, hereinafter described. It will be noted that the top extends beyond the wringer frame so that when it is moved upwardly on the hinge, there is definite separation of the top throughout the length of the wringer.

A pressure spring 17a rests on the upper bearing blocks and exerts pressure from the top through an adjusting means which comprises a channel piece 21 having stepped notches. These notches are adapted to receive extensions 21a on a bracket secured to the spring. A pin 22 extends from the channel piece 21 through a slot 23 in a guide housing 24 and through an opening 25 in the top. By sliding this pin, and with it the channel piece, different steps may be brought in position on the projections 21a so that when the top is brought to position, greater or less pressure may be delivered through the spring, depending on the step selected.

The outer end of the top is connected to the frame through resetting and release mechanism, which will be later explained.

Rocker rods 26 extend longitudinally of the wringer and are carried in bearings 27 in the plate 28 at the drive end of the wringer, the plate 28 being secured to the gear head and in bearings 27a in a plate 28a at the outer end of the wringer.

Links 29 are secured on the drive ends of the rods 26 and are pivoted by screws 30 extending through openings 31 in said links on the post 6. Links 32 are fixed on the outer ends of the rods 26 and are supported by screws 33 extending through openings in the post 9 into openings 34 in the links. Thus the wringer frame is suspended on these parallel links, the links in swinging being tied together by the rods and permitting the forward and back movement of the wringer frame while maintaining the wringer frame in an upright vertical position.

It will be noted that the slight arc involved in this travel places the wringer frame at the lowest point at the center so that the weight of the wringer frame in itself tends to center the wringer frame at the neutral position. This suspension permits a movement of the wringer frame in response to a pull of an operator caught in the rolls so as to effect what is known as an instinctive release, this movement being conveyed to the different mechanisms to effect a safety action of the wringer.

The wringer is driven from a vertical shaft 36 extending to the usual power means. The shaft is carried in a bearing 37 in the gear head 19, and the lower end of the shaft is provided with a copling sleeve 38 to facilitate a detachable coupling with the lower driving mechanism. Reversing gears 39 and 40 are journalled on the shaft 36, and both gears 39 and 40 mesh with a driven gear 41. The gear 41 has a hub 42 which forms a supporting shaft for the gear and this hub is journalled in a bearing 43 in the gear head. A driving shaft 44 is fixed in the hub 42 and has an out-of-round end 45 operating in an out-of-round socket 46 in a coupling member 47. The coupling member has an out-of-round opening 48 which engages an extension 49 on the bearing member 15. The member 15 is conical shaped and rides in an inclined bearing surface 50 in a lower block 50a.

A pin 51 is fixed in the shaft 13a and is adapted to engage the walls of an open socket 52 in the end of the member 15. A spring 52a is arranged between the end of the shaft 13a and the bottom of the opening in the member 15 and consequently yieldingly forces the member 15 up the incline 50, moving the slot 52 out of engagement with the pin 51 when pressure is released on the rolls. This forms a pressure stop which is fully described in one of my former patents, No. 2,123,850, so that when the roll is relieved of pressure through a pressure release the driving connection is also released.

The gears 39 and 40 have clutch grooves 53 and 54, the driving walls of which are inclined and these are adapted to engage similar projections 55 on a clutch block 56, the clutch block being slidingly mounted on the shaft 36 and locked relatively thereon by a spline 55a. The block has a circumferential groove 57 into which enters a crank pin 58. The crank pin is carried by an arm 59 of a bell crank lever, the bell crank lever being pivoted on a pin 60 secured in the gear head. The opposite arm 61 of the bell crank lever is connected by a pivot 63 with a link 62. The link 62 is connected by a pivot 64 with a rock arm 65. The rock arm 65 is mounted on a shaft 66. This shaft has an extension 67 which extends into a sleeve 70, the shaft 66 being journalled in a bearing 71 on the gear frame.

A handle 72 is secured on and fixed to the sleeve 70, this handle being the manually operated handle for setting and releasing the driving clutch. It does not, however, directly move the clutch operating crank pin 58. Indirectly, however, it does effect the swinging of this pin which, through its engagement with the slot 57 provides for moving the block 56 so as to engage or disengage the clutch detents, the engagement of these detents with the gears 39 and 40 driving the wringer in opposite directions in the usual manner. It will, however, be noted that the driving surfaces of these clutch members are inclined so that the driving torque of the wringer through these engaging surfaces tends to disengage the clutch detent members. This is utilized for effecting an overload release of the driving connection.

The clutch control communicating and locking means is as follows:

The shaft 67 extends through an opening 68 in a control member 69. The shaft 67 is supplied with splines 73 which enter slots 74 in the member 69 so that the member 69 is locked to move with the clutch operating crank mechanism. Latch members 75 and 76 are journalled on the shaft 66 and are free to rotate thereon. These members cross each other at the shaft and the lower ends have longitudinally extending ears 77 and 78 respectively, these ears extending through openings 79 and 80 in a rocker plate 81. The plate 81 is fixed on the sleeve shaft 70 and consequently is responsive to movement of the manual clutch setting handle 72.

A spring 82 extends between the upper ends of the latch members 75 and 76 and tends to close the lower ends of these members, thus moving the projections 77 and 78 toward each other. The openings 79 and 80 are separated by a bridge piece 83 which limits the movement of the members 75 and 76 and the projections 77 and 78 toward each other.

A head 69a is formed at the bottom of the member 69 and this head operates between the members 77 and 78. It is slightly wider than the bridge piece 83 so that the projections 77 and 78 are normally kept in engagement with this head. A spring 84 is secured to the upper end of the member 69 and to a bracket 84a secured to the gear head. This spring returns the control member 69 to a vertical or neutral position when this member is released.

It will be noted that as the handle 72 is turned, the rock plate 81 operating on the projections 77 and 78, moves the assembly, including the latch members 75 and 76 and the control member 69, and that this movement is thus communicated to the shafts 67 and 66 and from them to the crank operating the clutch block.

A locking or latch member 85 is provided with a slot 86 through which a screw 87 extends for slidingly securing this member on the end of the bracket 28. This locking member has an opening 89 through which the shaft 66 extends, and this assists in guiding the locking member.

A pin 90 extends from the rocker member 81 through a cam slot 91 in the locking member 85. The lower part of the slot has inclined cam surfaces 92 and 93, these cam surfaces being inclined upwardly from the center of the slot. The lower ends of the latch members 75 and 76 are provided with latching detent surfaces 75a and 76a. The lower end of the locking member is provided with locking or detent projections 94 and 95. The locking member at the ends of the cams is provided with locking notches 96.

As the manually operated clutch handle is turned, the members 69, 75 and 76 are swung in the manner hereinbefore described. As the pin 90 swings, it rides the cam 92 or 93 in the direction in which it is swung, and this forces the locking member 85 downwardly so that the end of the latching member 75 or 76 moving toward the locking or latch projection 94 or 95 is free to pass over this projection and as the pin enters the notch 96 the locking member is snapped upwardly by the spring 85a and this brings the locking surface 75a or 76a back of the projection and locks the rocker assembly of the members 75, 76 and 69 in this position. Thus the clutch is locked or held in this locked position notwithstanding the tendency of the spring 84 and the inclined torque actuated detents to move the assembly to a release position.

It will be noted, however, that the tendency of movement of the shaft 67, and consequently the control member 69, is in a direction away from the engaged end of the latch member 75 or 76 which may be engaged so that the resistance to this releasing or backward movement is provided by the spring 82 joining the latching members 75 and 76 at their upper ends.

If, therefore, there is sufficient overload to provide a torque camming action on the inclined jaws of the clutch to overcome the spring 82, the movement communicated to the control member moving the free latching member 75 or 76, moves the projection 77 or 78 against the edge of its slot 79 or 80 as the case may be, thus backing up and forcing a movement of the rocker member and with the rocker member the pin 90. This pin acting as a cam on the wall of the notch 96 depresses or actuates the locking member 85 and this permits the controlling assembly, member 69 and latching members 75 and 76, to return, through the influence of the spring 84 and the inclined cams, to neutral position and with this movement the crank is free to release the clutch jaw and the centralizing action of the spring 84 brings the clutch block to its neutral position and holds it there free from engagement of the detents.

As the load varies through variation in the material passing the wringer, there is a slight oscillating movement of the jaw clutches through the yielding of the spring 82, and this spring is so resistant as to yield sufficiently to effect a release only with a definite overload, but the parts are sensitive to reflect an overload and may be adjusted so as to prevent any release except where there is an overload. This initial movement, however, provides the release of the drive connection overload without a severe inertia shock from the driving motor. The lost motion connections provided by the projections 77, 78 and the openings 79, 80 permit partial separation of the tapered clutch surfaces 53, 54, 55 under normal load prior to starting actuation of the safety release latch 85 to release the driving connection and stop the roll drive.

It is desirable to release the driving connection when the index is operated to swing the wringer to a different position. In the present structure the index is formed as follows:

The plate 3 has a series of index openings 97. A locking pin 98 is adapted to enter these openings. The pin is slidingly mounted in projections 99 extending from the swivel head 4. A spring 100 operating between the projections and a pin 101 yieldingly depresses the pin 98. A lever 102 extends into an opening 103 in the pin 98. The lever 102 is pivotally mounted between the ears 103 extending from the post 6 by a pin 105. It will readily be seen that by manipulating the lever by means of a handle 102a, the index pin may be lifted.

The lever 102 extends through an opening 106 in the bottom of the locking member 85. When, therefore, the outer end of the lever is depressed to lift the index pin, it engages the bottom 107 of the opening 106 and depresses the member 85. If the clutch is set, the pin 90 is released from the notch 96 and the clutch mechanism immediately thrown to neutral through the influence of the spring 84. Consequently whenever a change in the position of the wringer is intended, the mere release of the indexing mechanism at the same time releases the clutch and stops the driving of the wringer.

It is also desirable to release the clutch when the wringer is moved through the instinctive pull of the operator. This is accomplished through the following mechanism:

The links 29 have bell crank extensions 108 with engaging ends 109. These ends are adapted to engage a lip 110 extending from the member 85 at the bottom of the opening 89. When, therefore, the links are swung in either direction, one or the other of the arms 108 will be depressed so as to depress the member 85 and consequently release the clutch. This immediately stops the wringer and further injury to the operator.

The wringer is provided with a resetting and pressure release device at its outer end permitting the top bar to swing up on the hinge 10 and thus relieve pressure on the rolls and provides means whereby pressure may be reset on the rolls. A toggle 111 is provided between the top and the frame. One link 112 of the toggle 111 is hinged at 112a to the top bar. The other link 113 of the toggle 111 is provided with side flanges 114 and cross web 115 joining the flanges 114. Brackets 116 extend from the side stile 12 and the link 113 is pivoted between the brackets 116 by a pivot pin 117. The link 113 is also pivotally connected at 118 with the outer link 112 of the toggle. A spring 117a is coiled around the pin 117 and the free end engages the cross web 115 and this accelerates the release movement of the toggle.

A latch 119 is pivoted at 120 on the side stile. A spring 121 is secured to a notch 122 at the upper end of the latch and to one of the brackets 116. This yieldingly forces the latch toward locking position. The latch has an out-turned lower end in which there is a latch notch 123. This notch is adapted to receive a locking wedge 124 on the web 115. The out-turned flange has a camming face 123a which is adapted to swing the latch to permit the completion of the movement of the toggle in the resetting operation.

It will be understood that the toggle is utilized as a resetting device, the link 112 being extended so as to give sufficient leverage to draw the top bar down to reset the pressure on the spring 117a. This toggle is unstable either through the arrangement of the pivots of the toggle or the spring 117a.

Two means of releasing the latch are provided, one that may be operated independently of the instinctive release and the other in response to a movement of the wringer frame in effecting an instinctive release. Rock arms 126 and 126a are secured on the ends of the trip bars 125. These bars are in the form of rods extending along the front and rear of the wringer. The ends are bent inwardly and have horizontally extending portions 126a. These horizontal portions are of sufficient length so that when the bars are turned upwardly in the plane of the inner openings of the stiles, they may be moved sidewise sufficiently to permit the insertion of the horizontal extensions in the openings 125b in the side stile. As the bail or rod is turned to its normal position, it is locked against endwise movement by the engagement of the inturned portion of the rod engaging the inner faces of the stiles.

The rock arm 126 has a slot 127, and the rock arm 126a an opening 128. These are fixed on the ends of the bars. The latch 119 has a cam opening 130 and a screw 129 extends through the opening 130 and the slot 127 and is secured in the opening 128. The screw head overlaps the face of the arm 126 and the shank of the screw is adapted to engage the inclined cams 131 and 132 in the walls of the opening 130.

The result of this structure is that when the trip bar is moved in either direction so as to force the rock arm 126 or 126a upwardly or downwardly, the screw operates on the cam 131 or 132 as the direction may bring to play, so that either movement of the trip rod effects a swinging of the latch plate 119 to release the toggle and thus release the pressure on the wringer.

In order that the release may be effected as the wringer frame is moved, the following structure is provided:

A link 133 is connected by a pin 134 with an arm 135 extending from the latch 119. The link 133 is provided with a plate 133a which extends in a horizontal plane from the face of the link. The link also has a guide extension 133b which extends through an opening 136 in a lip 128b extending outwardly from the plate 28a. The links 32 have arms 137 forming bell cranks with the links and these arms have bearing ends 138 which engage the plate 133a.

As the wringer is rocked one or the other of the arms will be depressed, depending on the direction in which the wringer is moved, and this draws down the link 133 and this, acting on the lever arm 135, swings the latch plate 119 to release position, thus releasing the pressure on the wringer.

It is desirable where the pressure of the wringer is released, especially for emergency purposes, to also release the drive. In the present structure where the release of pressure is accomplished through instinctive action, the same swinging of the wringer would effect the release of the driving connection in the manner heretofore described, but if the release is accomplished through the trip bars, this might be accomplished through the roll stop we have heretofore described. It may be accomplished, however, by throwing the driving clutch. In the present structure this may be accomplished by the levers 139. These are connected by a pivot connection 140 with the stile 11. The ends of these levers extend through openings 141 in the locking member 85. Springs 142 are secured in openings 143 in the levers and to the brackets 144 extending from the gear head.

The levers 139 have extending arms 145 which extend upwardly and laterally to a point engaging the under side of the top bar. When the top bar is lowered to set position, these lever extensions are engaged by the underside of the top bar and by reason of the inclination or offsetting from the lever pivot, the extensions are forced laterally and this swings the levers 139 upwardly.

If the top bar is released, the extension at the same time is relieved of the holding pressure of the top bar and the springs 142 acting on the levers draw the levers downwardly. If the member 85 is in the upper position, in other words, if the clutch is set for driving, this downward movement of the levers carries the member 85 downwardly and releases the pin 90 from the notch 96 and the control plate 69 is swung and with it the clutch is returned to neutral. This means of breaking the driving connection supplements that of the roll stop heretofore described. Either will accomplish the purpose and either may be used, depending on the other conditions of construction.

It will be seen, therefore, that with this wringer the driving connection may be manually controlled, or the driving connection is released through instinctive action on the wringer, and that the wringer when in operation has the torque driving elements of the clutch yieldingly held in engagement by a spring as against a torque induced separating tendency. The spring movement of these parts is desirable in that it retains these moving parts in free sliding relation. It also permits of a movement of the parts practically to release position before the overload takes place so that with a slight addition to the overload the release is accomplished without a building up of inertia shock from the motor when the final overload unlocking of the control means takes place, which would probably take place if the overload were not relieved. This manner of handling the overload and the clutch mechanism associated therewith provides a rugged and simplified mechanism responsive not only to the instinctive release but also to a manual release. It is also responsive to a pressure release. It also lends itself readily to operating in conjunction with a pressure release.

The manner of suspending the wringer is very advantageous in that the drive control and wringer can all be assembled and then attached to the support by merely securing the links which are on the wringer to the supporting plates carried by the post.

The links through gravity tend to center the wringer at the low spot in its movement, thus tending to hold the wringer normally at the center of its movement. The arms on the links acting against the spring 121 also tend to center the wringer. Through these the instinctive control may be made as sensitive as desired.

What I claim as new is:

1. In a wringer or the like, the combination with a frame, of rolls mounted in the frame, and a driving means for a roll, a reversing mechanism for the driving means comprising a clutch in the driving means, a rotatively mounted control member operatively connected with the clutch, latch members swinging with the control member and engaging opposite sides of one end of the control member, spring means acting to close the latch members on the control member, and a locking member adapted to lock one or the other of the latch members, and actuated by a yielding of the clutch to unlock the latch member.

2. In a wringer or the like, the combination with a frame, of rolls mounted in the frame, and a driving means for a roll, a reversing mechanism for the driving means comprising a clutch in the driving means, a rotatively mounted control member operatively connected with the clutch, latch members swinging with the control member and engaging opposite sides of one end of the control member, spring means acting to close the latch members on the control member, a locking member adapted to lock one or the other of the latch members, and a manually actuated means setting the clutch and spring means for actuating the locking member.

3. In a wringer or the like, the combination with a frame, of rolls mounted in the frame, and a driving means for a roll, a reversing mechanism for the driving means comprising a clutch in the driving means, a rotatively mounted control member operatively connected with the clutch, latch members swinging with the control member and engaging opposite sides of one end of the control member, spring means acting to close the latch members on the control member, a locking member adapted to lock one or the other of the latch members, acting in response to a yielding of the clutch, and a manually actuated means setting the clutch and actuating the locking member.

4. In a wringer or the like, the combination with a frame, a mounting for the frame permitting a forward and back movement of the frame, rolls mounted in the frame, and a driving means for a roll, of a rotative manual control, a rocking member actuated by the manual control, a clutch in the driving means having engaging driving members acting to release the clutch under torque, a control member operatively connected with the clutch, latch members movable with the control member, spring means yieldingly drawing the latch members into engagement with the control member, a connection between the latch members and the rocking member, and a locking member locking a latch member as the clutch is set and yieldingly retaining the clutch in set position through the spring means connecting the latch members, the members through the manual control being adapted to set the clutch.

5. In a wringer or the like, the combination with a frame, a mounting for the frame permitting a forward and back movement of the frame, rolls mounted in the frame, and a driving means for a roll, of a rotative manual control, a rocking member actuated by the manual control, a clutch in the driving means having engaging driving members acting to release the clutch under torque, a control member operatively connected with the clutch, latch members movable with the control member, spring means yieldingly drawing the latch members into engagement with the control member, a connection between the latch members and the rocking member, a locking member locking a latch member as the clutch is set and yieldingly retaining the clutch in set position through the spring means connecting the latch members, the members through the manual control being adapted to set the clutch, and means responsive to movement of the wringer in its mounting releasing the locking member.

6. In a wringer or the like, the combination with a frame, a mounting permitting an indexing movement of the frame, an indexing device for locking the frame in index position, rolls mounted in the frame, and a driving means for a roll, of a driving connection in the driving means acting through the torque resistance of the rolls to release the connection, devices opposing torque induced release movement preventing a release with less than an overload and reversing their action with an overload means releasing the driving connection in response to an overload, and devices operative with a release of the indexing means releasing the driving connection.

7. In a wringer or the like, the combination with a frame, rolls mounted in the frame, driving means for a roll, and a pressure release device for the roll, of a driving connection for the driving means tending through the torque resistance of the rolls to release the connection, means for releasing the connection responsive to an overload, and devices actuated as the pressure release device is operated to release the torque releasable connection.

8. In a wringer or the like, the combination with a frame, rolls mounted in the frame, driving means for a roll, a supporting arm for the frame extending lengthwise of the frame, of a pair of supporting links at each end of the frame supporting the frame from the arm, and a pressure release device responsive to a link movement of an end of the frame.

9. In a wringer or the like, the combination with a frame, rolls mounted in the frame, driving means for a roll, a supporting arm for the frame extending lengthwise of the frame, of a pair of supporting links at each end of the frame supporting the frame from the arm, and a resetting and pressure release device responsive to a link movement of an end of the frame.

10. In a wringer or the like, the combination with a frame, rolls mounted in the frame, driving means for a roll, a driving connection for the driving means, a supporting arm for the frame extending lengthwise of the frame, of a pair of supporting links at each end of the frame supporting the frame from the arm, a resetting and pressure release device responsive to a link movement of an end of the frame and means responsive to a link movement at the driving connection end of the frame releasing the driving connection.

11. In a wringer or the like, the combination with a frame, rolls mounted in the frame, and a driving means for a roll comprising separable members movable toward the disengaged position by the driving torque, of spring means opposing separation of said members under normal load with increasing resistance, a latch preventing complete separation of said members, actuating means for the latch, and a lost motion connection between one of the members and the actuating means permitting partial separation of the members under normal load prior to starting the actuating of the latch.

12. In a wringer or the like, the combination with a frame, rolls mounted in the frame, and a driving means for a roll comprising separable members movable toward the disengaged position by the driving torque, of spring means opposing separation of said members under normal load with increasing resistance, a latch preventing complete separation of said members, said latch comprising frictionally engageable parts, actuating means for disengaging said parts to release the latch, and a lost motion connection between one of the members and the actuating means permitting partial separation of the members under normal load prior to starting the actuation of the latch.

13. In a wringer or the like, the combination with a frame, rolls mounted in the frame, and a safety release having latch members with frictionally engageable detent surfaces, of an actuating means for moving one of the latch members during a continuous movement of said actuating means to disengage the detent surfaces, a lost motion connection between the actuating means and said one latch member, and spring means resisting with increasing force movement of the actuating means prior to take up of the lost motion in said connection.

14. In a wringer or the like, the combination with a frame, rolls mounted in the frame, and a driving means for a roll, of a clutch in the driving means having driving jaws with inclined faces having camming action to release the clutch under torque, means responsive to releasing movement of the jaws resisting such movement with increasing resistance up to a predetermined torque overload whereby the jaws prior to such overload are in driving engagement and partially cammed apart, detent means preventing release of the jaws, and actuating means for releasing the detent means, said actuating means being normally inactive but responsive to releasing movement of the jaws beyond said partially cammed apart position.

15. In a wringer or the like, the combination with a frame, rolls mounted in the frame, and a driving means for a roll, of a clutch in the driving means having engaging driving members to release the clutch under torque, spring means resisting with increasing force movement under normal load of the clutch toward the released position, latch preventing complete disengagement of the driving members having a lock, and means responsive to releasing movement of the clutch for unlocking the latch.

16. In a wringer or the like, the combination with a frame, rolls mounted in the frame, and a driving means for a roll, of a safety release latch, a locking member for the latch, an actuating means, spring means resisting with increasing resistance the initial part of the movement of the actuating means, and an operating connection between the actuating means and the locking member for unlocking the latch, said operating connection having lost motion permitting said initial movement free of the locking member.

17. In a wringer or the like, the combination with a frame, rolls mounted in the frame, and a driving means for a roll, of a reversing mechanism for the driving means comprising a clutch for the driving means having engaging driving members to release the clutch under torque, a clutch control member having a driving position, latch means preventing movement of the clutch control member out of the driving position, and operating means for releasing the latch, said operating means permitting starting the movement of the clutch control member toward the disengaged position prior to starting release of the latch.

18. In a wringer or the like having a roll drive, the combination of actuating means movable in response to the driving torque, spring means resisting the torque movement of the actuating means whereby the movement of the actuating means corresponds to the magnitude of the torque, and a safety release operated by movement of the actuating means corresponding to a predetermined maximum torque, and means actuating the safety release in response to a thrust on the rolls.

19. In a wringer or the like having a roll drive, the combination of actuating means having a neutral position corresponding to no load and movable from neutral in response to torque, spring means opposing the torque movement of the actuating means with increasing resistance, and a safety release latch actuated alternatively by movement of the actuating means corresponding to a predetermined maximum torque or in response to a thrust on the rolls.

20. In a wringer or the like having a roll drive and a safety release, the combination of actuating means movable in response to the driving torque from a predetermined position, spring means resisting movement of the actuating means from the predetermined position with increasing resistance, and safety release means spaced from the actuating means in the predetermined position and engaged by the actuating means upon movement thereof to one side of the predetermined position.

WALTER L. KAUFFMAN, II.

REFERENCES CITED

The following references are of record in the file of this patent:

UNITED STATES PATENTS

| Number | Name | Date |
|---|---|---|
| 1,320,061 | Johnson | Oct. 28, 1919 |
| 1,549,983 | Hume | Aug. 18, 1925 |
| 1,677,863 | Hume | July 17, 1928 |
| 1,762,155 | Buss | June 10, 1930 |
| 1,944,433 | Kauffman | Jan. 23, 1934 |
| 2,013,261 | Wenger | Sept. 3, 1935 |
| 2,149,866 | Parish | Mar. 7, 1939 |
| 2,216,392 | Kauffman | Oct. 1, 1940 |
| 2,216,746 | Kauffman | Oct. 8, 1940 |
| 2,259,824 | Lowder | Oct. 21, 1941 |
| 2,291,916 | Parish | Aug. 4, 1942 |
| 2,307,368 | Etten | Jan. 5, 1943 |
| 2,322,384 | O'Callaghan | June 22, 1943 |
| 2,342,259 | Etten | Feb. 22, 1944 |
| 2,346,738 | Etten | Apr. 18, 1944 |
| 2,387,086 | Moon | Oct. 16, 1945 |